(12) United States Patent
Backhausen et al.

(10) Patent No.: US 12,524,335 B2
(45) Date of Patent: Jan. 13, 2026

(54) DATA PROCESSING DEVICE

(71) Applicant: Infineon Technologies AG, Neubiberg (DE)

(72) Inventors: Ulrich Backhausen, Taufkirchen (DE); Julie Henzler, Munich (DE); Thomas Rabenalt, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 232 days.

(21) Appl. No.: 18/177,934

(22) Filed: Mar. 3, 2023

(65) Prior Publication Data

US 2023/0281117 A1      Sep. 7, 2023

(30) Foreign Application Priority Data

Mar. 4, 2022 (DE) .......................... 102022105146.3

(51) Int. Cl.
  *G06F 12/02* (2006.01)
(52) U.S. Cl.
  CPC ................. *G06F 12/0246* (2013.01)
(58) Field of Classification Search
  CPC ............. G06F 12/0246; G06F 12/0284; G06F 2212/1016; G06F 2212/1024; G06F 2212/502; G06F 13/1668; G06F 13/1647; G11C 29/702; G11C 8/12
  See application file for complete search history.

(56) References Cited

U.S. PATENT DOCUMENTS

| | | |
|---|---|---|
| 2008/0307252 A1 | 12/2008 | Bartley et al. |
| 2009/0040825 A1 | 2/2009 | Adusumilli et al. |
| 2011/0060868 A1* | 3/2011 | Haukness ........... G06F 12/0246 |
| | | 711/E12.001 |
| 2011/0320698 A1* | 12/2011 | Wang .................. G06F 13/1663 |
| | | 711/149 |
| 2013/0339555 A1* | 12/2013 | Schushan ............ G06F 11/3037 |
| | | 710/19 |
| 2022/0164297 A1* | 5/2022 | Sity ........................ G06F 3/0637 |

OTHER PUBLICATIONS

Nov. 9, 2022—(DE) Office Action—App. 102022105146.3.

* cited by examiner

*Primary Examiner* — Khoa D Doan
(74) *Attorney, Agent, or Firm* — Banner & Witcoff, Ltd.

(57) ABSTRACT

A method for dynamically activating a plurality of memory banks by way of a plurality of memory controllers in a chip, each of the memory banks being able to be read and written to independently of the other memory banks and each of the memory banks being able to be activatable by multiple of the plurality of memory controllers in each case. The method includes receiving information about an operating state of the chip, dynamically producing assignments of memory controllers to the memory banks based on the operating state of the chip, and activating the memory banks by way of the memory controllers in accordance with the produced assignments.

12 Claims, 19 Drawing Sheets

FIG 17

| Figure | Chip Status | Required parallel writing to the memory | | | Bank assignment to memory controller | | |
|---|---|---|---|---|---|---|---|
| | | Software-A | Software-B | Software-C | MC_1 | MC_2 | MC_3 |
| 9 | Reset | Bank_1 | Bank_2 | - | Bank: 1 | Banks: 2, 4, 5, 6 | Bank: 3 |
| 10 | After Boot Code | Bank_2 | Bank_3 | Bank_5 | Banks: 1, 2 | Banks: 3, 4 | Banks: 5, 6 |
| 11 | Software over the Air Update | Bank_2 | Bank_5 | Bank_6 | Banks: 1, 2 | Banks: 3, 4, 5 | Banks: 6 |
| 12 | After Software update | Bank_2 | Bank_3 | Bank_5 | Banks: 1, 2 | Banks: 3, 4 | Banks: 5, 6 |

FIG 18

| Figure | Chip Status | Required parallel writing to the memory | | | Bank assignment to memory controller | | |
|---|---|---|---|---|---|---|---|
| | | Software-A | Software-B | Software-C | MC_1 | MC_2 | MC_3 |
| 13 | Reset | Bank_1 | Bank_2 | - | Bank: 1 | Banks: 2 | Bank: 3,4,5,6 |
| 14 | After Boot Code | Bank_2 | Bank_3 | Bank_5 | Banks: 2 | Banks: 3 | Bank: 1,4,5,6 |
| 15 | Software over the Air Update | Bank_2 | Bank_5 | Bank_6 | Banks: 2 | Banks: 5 | Banks: 1,3,4,6 |
| 16 | After Software update | Bank_2 | Bank_3 | Bank_5 | Banks: 2 | Banks: 3 | Bank: 1,4,5,6 |

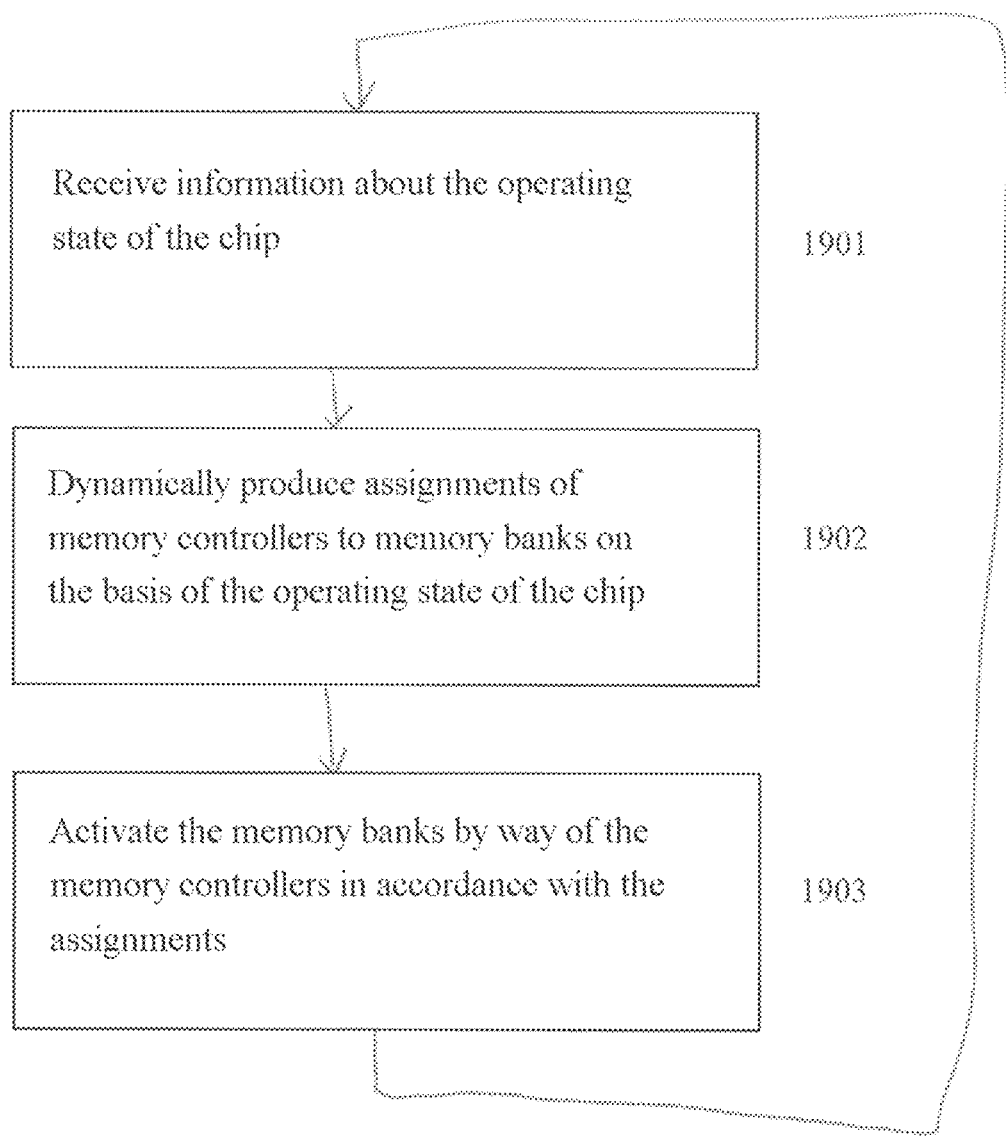

DATA PROCESSING DEVICE

TECHNICAL FIELD

Exemplary embodiments relate in general to chips and a method for activating memory banks within a microprocessor (MPU) or microcontroller (MCU).

BACKGROUND

For some types of memory of an MPU or MCU, such as embedded flash memories, or so-called embedded "emerging memories" such as phase change RAM (PCRAM) memories or resistive RAM (RRAM) memories, control sequences, i.e. sequences of operations, are necessary for changing the memory contents and for test operations. The term "embedded" is understood to mean that they are implemented in a chip with a further processing unit, in contrast to "stand-alone memories" in which the task of the chip is only to provide storage space.

On account of the complex control sequences, memory controllers, which encapsulate memory accesses and test operations, are typically provided for memories of such memory types, so that a simple interface is available to the accessing unit (e.g. a CPU) and accordingly to the user (e.g. programmer).

Multiple units that access the memory, e.g. processor cores or applications (programs), can be present and the memory can be subdivided into multiple independent memory banks such that it would be possible in principle for two units to access two of the memory banks simultaneously (i.e. to carry out a write access for example). However, the accesses must be made via a memory controller, as explained above.

Approaches that make it possible to carry out memory accesses efficiently in such a scenario are desirable. For example, two different programs should be capable of carrying out memory accesses to their assigned memory banks simultaneously, independently of one another. No dependencies should arise in this case (i.e. "freedom from interference"). This is an important requirement for functional safety and also for general security against external attacks, e.g. denial of service.

SUMMARY

According to one embodiment, a method for dynamically activating a plurality of memory banks by way of a plurality of memory controllers in a chip is presented, each memory bank being able to be read and written to independently of the other memory banks and each memory bank being able to be activated by multiple memory controllers in each case. The method contains the step of receiving information about the operating state of the chip. It also contains the step of dynamically producing assignments of memory controllers to memory banks on the basis of the operating state of the chip and the step of activating the memory banks by way of the memory controllers in accordance with the assignments.

A corresponding chip is provided according to a further embodiment.

BRIEF DESCRIPTION OF THE DRAWINGS

The figures do not reproduce the actual size relationships but are instead intended to be used to illustrate the principles of the various exemplary embodiments. Various exemplary embodiments are described below with reference to the following figures.

FIG. 17 uses an overview to show how memory banks and memory controllers in different operating states are assigned to one another.

FIG. 18 uses another embodiment to show how memory banks and memory controllers in different operating states are assigned to one another.

FIG. 19 shows the sequence diagram of a method for assigning memory banks and memory controllers.

DETAILED DESCRIPTION

The following detailed description refers to the appended figures, which show details and exemplary embodiments. These exemplary embodiments are described in such detail that a person skilled in the art can carry out the invention. Other embodiments are also possible and the exemplary embodiments can be modified in structural, logical and electrical respects without departing from the subject matter of the invention. The various exemplary embodiments are not necessarily mutually exclusive, but instead different embodiments can be combined with one another so that new embodiments arise.

Figure 1:
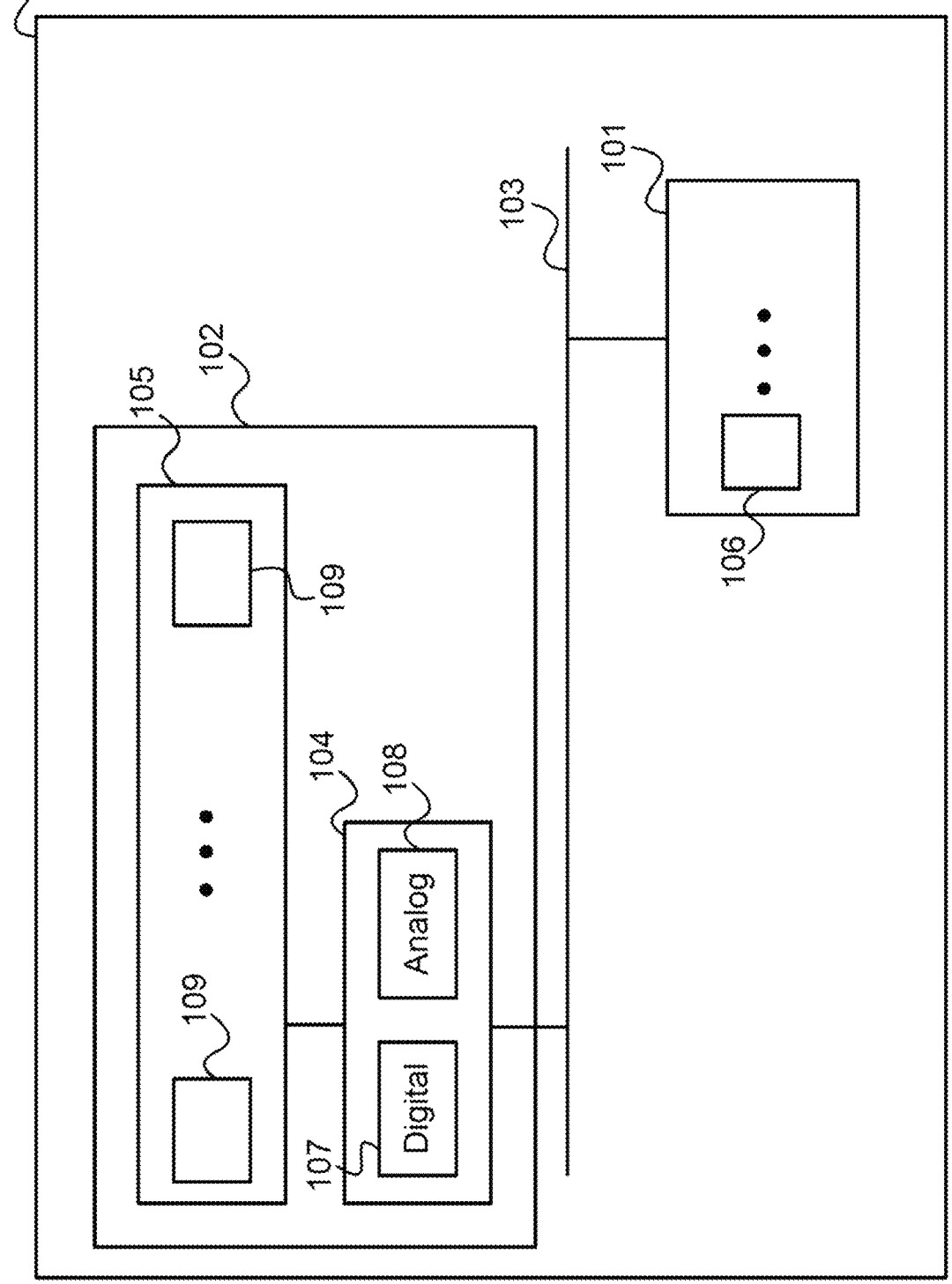
FIG. 1 shows a chip according to one exemplary embodiment.

FIG. 1 shows a chip 100 according to one exemplary embodiment.

The electronic chip 100 can be a microcontroller (MCU) or a microprocessor (MPU) in a vehicle, e.g. in an ECU (electronic control unit) in a car. It can also be a safety controller, a chip card IC (integrated circuit) of a chip card such as a smartcard of any form factor, e.g. for a passport or for a SIM (subscriber identity module), or a security controller.

The electronic chip 100 has an (application) processor 101 and a data memory system 102 which are connected to one another by means of a (computer) bus 103. The processor 101 can have one or more processor cores 106.

The data memory system 102 has a memory 105 and one or more memory controllers 104.

Depending on the design and the function, the electronic chip can have additional components such as input-output components, including communication components, e.g. for wireless communication, and various interfaces.

The processor 101 can execute various software (programs), for example an operating system and an application that runs in an environment provided by the operating system. An application is, for example, a software application for a virtual machine executed by the processor (or one of the cores 106 thereof). The one or more memory controllers 104 make accesses to the memory 105 possible for the processor 101 (or other components as well) for reading stored data and writing data to the memory 105 (which includes programming and deleting) or also for performing test operations.

According to various embodiments, the memory 105 is a memory in which control sequences, i.e. sequences of operations, are necessary for memory accesses and test operations, in particular a nonvolatile memory (NVM), for example an EEPROM (electrically erasable programmable read-only memory) such as a flash memory, in particular an eFlash (embedded flash) memory, a PCM (phase change memory) or an rRAM (resistive random access memory).

The memory controller or controllers 104 therefore encapsulate(s) memory accesses so that a simple memory access interface is available to the accessing unit (e.g. the processor 101, a processor core 106 or a process or application on the processor 101 or on a processor core 106) and accordingly to the user (e.g. programmer).

Every memory controller 104 has a digital part 107 and an analog part 108 for this purpose. The digital part 107 contains a control unit for example and thus controls the sequence of the memory access. With the aid of many signal changes within a sequence, adjustments in the analog part 108 and in the memory 105 are changed in order to achieve a successful memory access (e.g. writing to a memory bank). The analog part 108 generates the voltages and currents for performing the respective access. For this purpose it contains charge pumps and regulators for example. In addition, the memory banks 109 themselves can also have (smaller) local regulators/pumps.

According to one embodiment, the memory 105 is also subdivided into multiple memory banks 109, which are readable and writable independently of one another.

If multiple accessing units are present, e.g. multiple applications that run on the cores 106, the question arises in such a context of how the access by the multiple accessing units (e.g. software actuators) to the memory banks 105 is controlled.

This can be significant in particular in the case of memory controllers for nonvolatile memories (NVMs), such as e.g. embedded flash, RRAM or PCRAM. In the case of the memory controllers for volatile memories such as e.g. DRAM or SRAM, the read and write accesses do not differ substantially in regard to signals and time sequences.

Read access in the case of the memory controllers for nonvolatile memories (NVM) is normally very fast (~ nanoseconds), but write access is generally very slow in relation thereto (order of magnitude of microseconds, milliseconds or even seconds, e.g. in the case of flash memories that are frequently written to). The reason is that sequences containing many different steps need to be controlled, for which different voltages and currents are switched.

While it is possible to switch from read to write mode and back relatively quickly in the case of DRAM/SRAM controllers, this is not possible in the case of NVM controllers. DRAM/SRAM controllers thus facilitate fast, sometimes also mixed "read/write" access to different memory banks, whereas an active memory controller for NVMs is absolutely able to block read access to the memory bank for milliseconds during writing. The various complicated sequences of voltage values and currents mean that an NVM memory controller can also handle only one sequence at a time; that is to say that if write access with other data to a different memory bank is supposed to take place at the same time as and independently of this, a further independent memory controller is necessary because the write accesses take a very long time.

Figure 2:
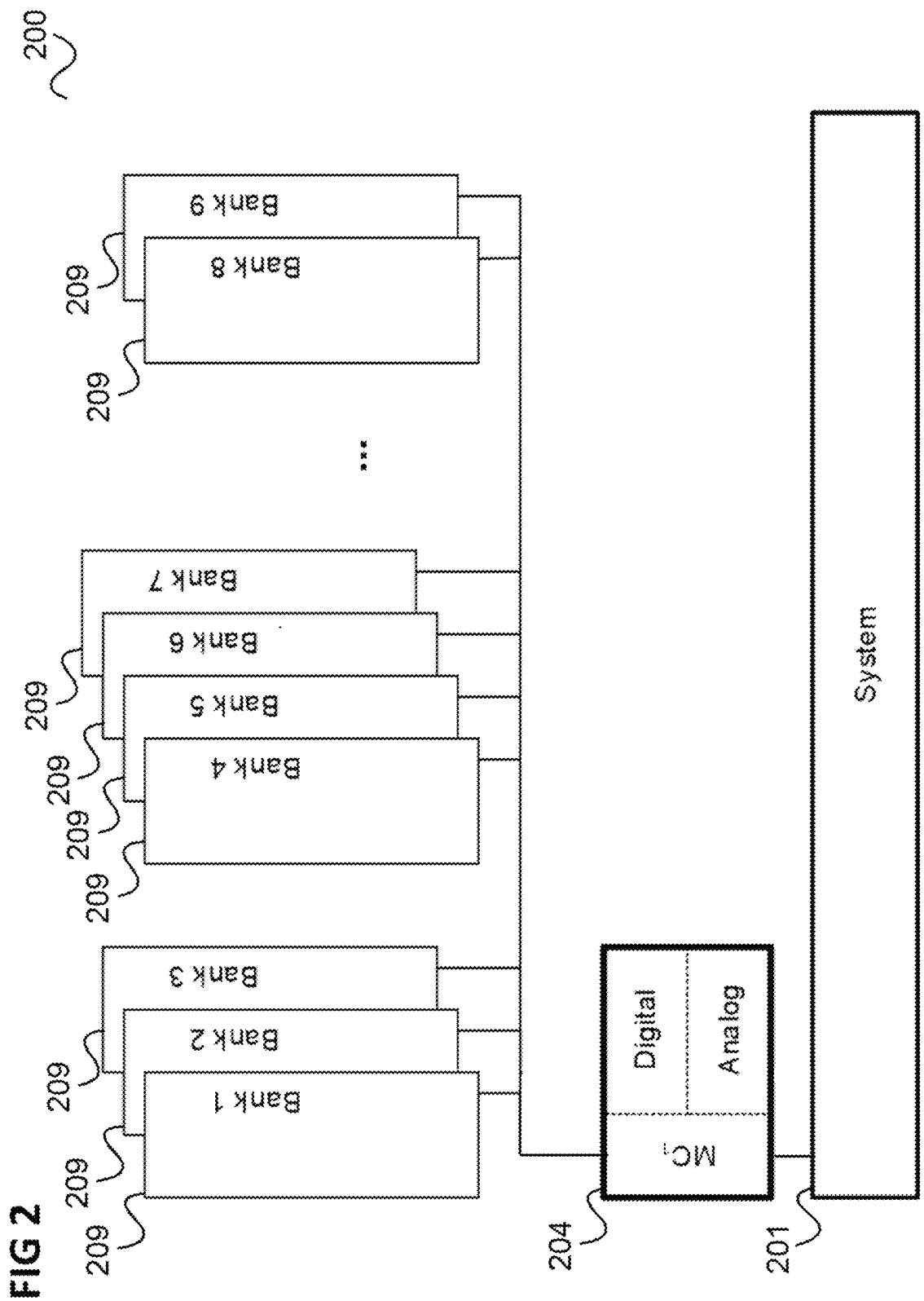
FIG. 2 shows an architecture in which memory banks are accessed by a memory access system via a single memory controller that controls the access to all memory banks.

FIG. 2 shows an architecture in which memory banks 209 are accessed by a memory access system 201 (which contains the processor 101 for example) via a memory controller 204 that controls the access to all memory banks 209.

Thus the connection or assignment of the memory controller 204 to the memory banks 209 is fixed.

In this approach, it is not possible, owing to the shared memory controller 204, for two different software actuators to write mutually differing data simultaneously and independently to two memory banks MBk and MBj. Instead, time slices and a scheduling with queues, for example, are used to make it possible for accessing units to write to different memory banks 209. If the memory controller 204 fails, none of the memory banks 209 can be written to.

Figure 3:
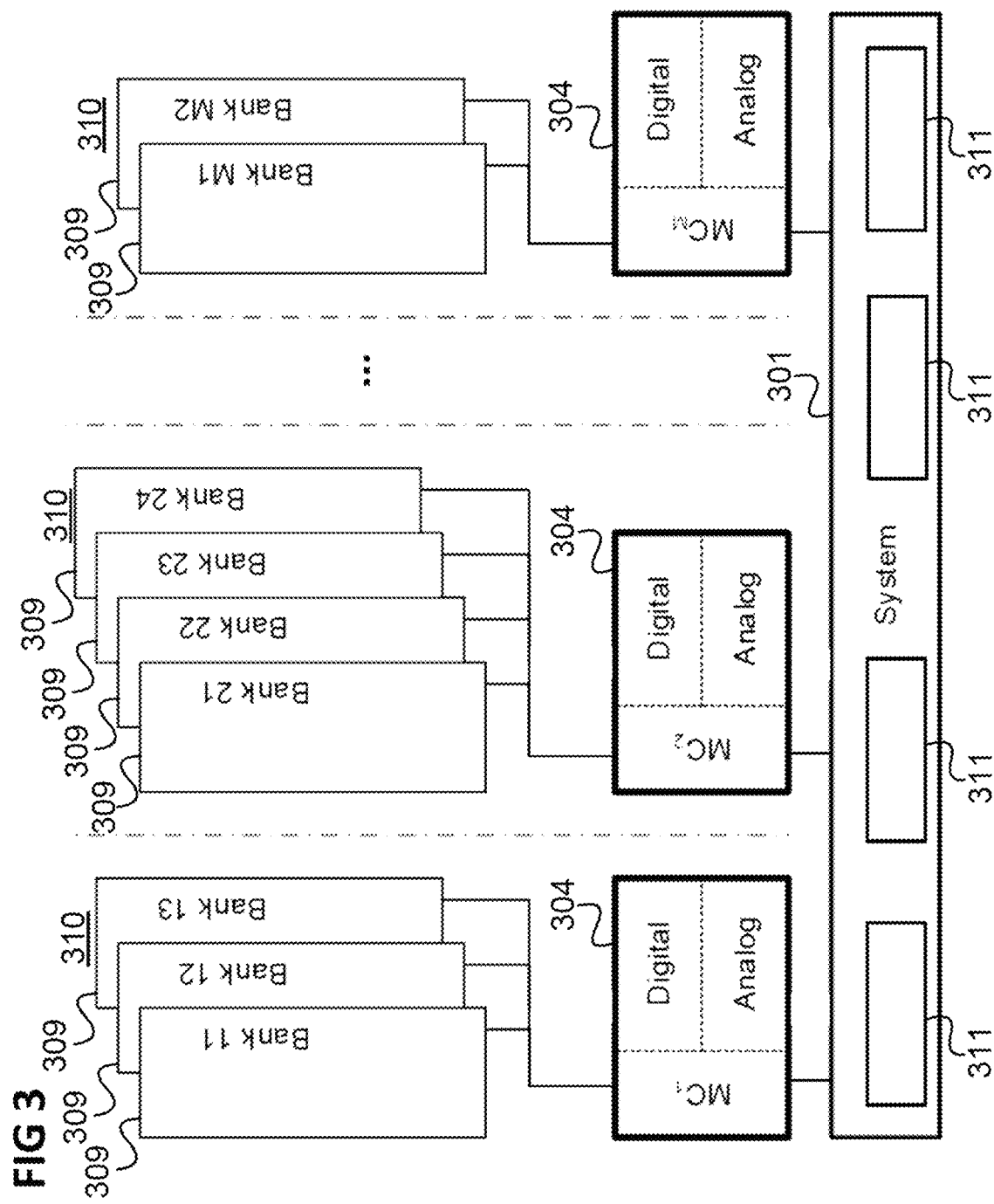
FIG. 3 shows an architecture in which multiple memory controllers are provided in order to access memory banks.

FIG. 3 shows an architecture in which multiple memory controllers 304 (M in number) are provided in order to access memory banks 309 (N in number), wherein each memory controller 304 is a "local" memory controller, i.e. responsible for a subgroup 310 of the memory banks 309.

The connection or assignment of each memory controller 304 to the respective subgroup is fixed, i.e. a memory controller $MC_i$ controls (only) the access by a memory access system 301 to memory banks $MB_{i1}$ to $MB_{in}$.

In this approach, it is not possible, owing to the shared memory controller 304, to write simultaneously to two memory banks $MB_{ij}$ and $MB_{ik}$ of the same subgroup 310.

If a memory controller 304 fails, none of the memory banks 309 of the respective subgroup 310 can be written to.

For example, the memory access system 301 contains four virtual machines (or programs) 311 and three memory controllers 304 that control the access to nine memory banks 309, which are subdivided into three subgroups 310. It is then possible to write to the three subgroups 310 simultaneously and independently of one another. It is not possible, however, to write to two memory banks 309 (e.g. $MB_{23}$ and $MB_{24}$) that are part of the same subgroup 310, for example. Therefore not all application cases for independent writing can be covered. Providing a separate memory controller 304 for each memory bank 309, however, is typically not desirable because it would lead to considerable space expense and costs. In addition, this approach also does not create any fault tolerance in the case of a failure of one memory controller.

According to various embodiments, it is therefore provided that the assignment of memory controllers 304 to memory banks 309, or the grouping of the memory banks 309 into the subgroups 310, can be defined, i.e. in particular modified, dynamically during runtime by the memory access system 301.

Figure 4:
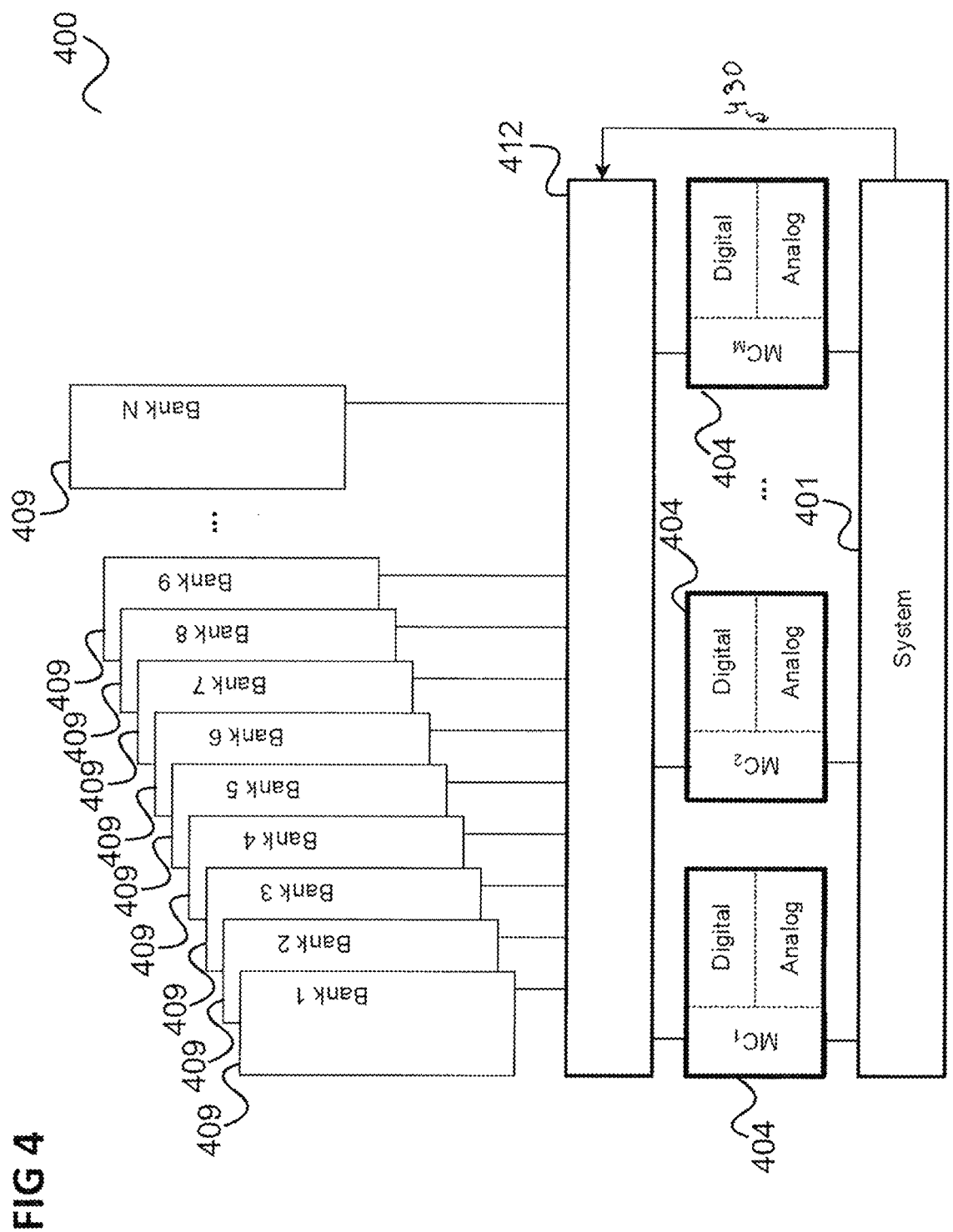
FIG. 4 shows a chip according to one embodiment.

FIG. 4 shows a chip 400 according to one embodiment.

Multiple memory controllers 404 (M in number) are provided in order to make it possible for a memory access system 401 (which contains the processor 101 for example) to access memory banks 409 (N in number).

The chip 400 enables a dynamic assignment of the memory banks 409 to the memory controllers 404. This assignment is controlled, i.e. defined, by the memory access system 401. This can be done dynamically during the running time of the chip 400, i.e. while the memory access system 401 is executing programs.

Each memory bank 409 can be assigned to one of the memory controllers 404. This therefore yields $(M+1)^N$ possible assignments, from which the memory access system 401 successively selects and determines assignments. This also includes all combinations in which there are memory banks that are temporarily not assigned to any memory controller (therefore M+1). One possible application case would be the deactivation of the write access to a subset of the memory banks in one phase of the product lifecycle.

If the memory access system 401 has determined an assignment, then it informs an allocation unit 412 of the assignment (e.g. via a corresponding selection signal 430). The allocation unit 412 routes the signals that are output by the memory controllers 404 to the correct memory banks, i.e. links each memory controller 404 to the memory banks 409 that are currently assigned to it. The allocation unit 412 also ensures that the analog signals from the analog parts 108 are switched to the correct banks 109 and all requirements for reliability are maintained in doing so (e.g. via a system of switches that safely switches possibly high currents and voltages on and off and keeps those banks 109 that are not activated in a safe operating state).

If the memory access system 401 selects a suitable assignment for this and implements it, then simultaneous access is possible for each combination of two memory banks 409 (i.e. if the assignment provides that a respective memory controller is assigned to each memory bank). A complicated mechanism based on time slices is not required. If one of the memory controllers 404 fails, the memory access system 401 can compensate this by no longer assigning the failed memory controller to any memory bank. This decreases the performance of the chip 400, but the access to the entire memory remains possible (graceful degradation).

When selecting the assignment, the memory access system 401 can also take the capacity utilization of the memory controllers 404 into account. This enables efficient use of the memory controllers 404, in particular if a large part of the memory is in read mode (in which the memory controllers are not involved according to various embodiments) most of the time.

At the beginning of operation of the chip 400, a starting assignment can be configured. For the example with three memory controllers and nine memory banks, for instance, this is an assignment as illustrated for the architecture of FIG. 3. Due to the three memory controllers, three subgroups of memory banks are possible in this case. Proceeding from such a starting assignment, the memory access system 401 can define a new assignment.

Figure 5:
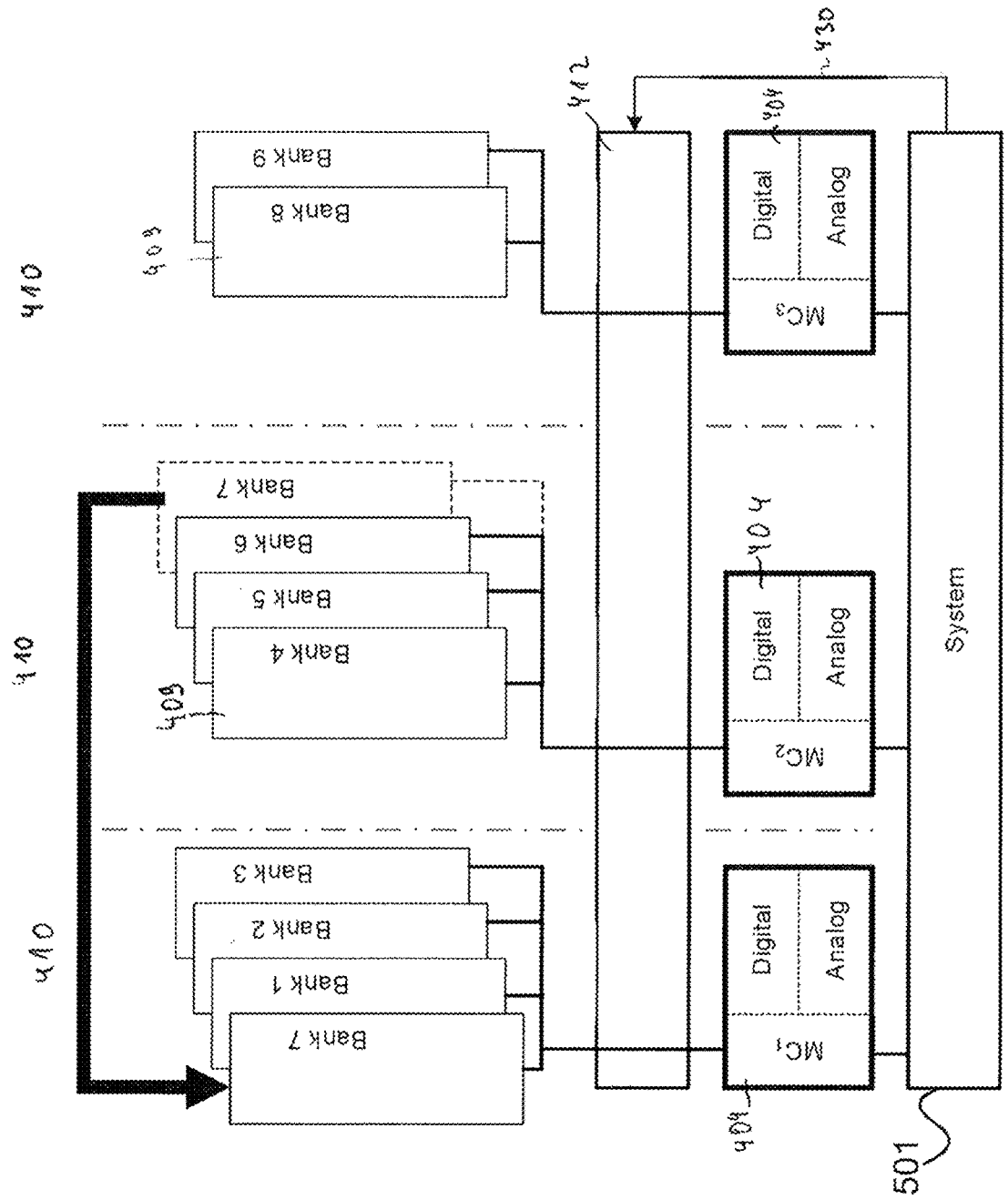
FIG. 5 illustrates the displacement of a memory bank from a subgroup that is assigned to one memory controller to a subgroup that is assigned to a different memory controller.

FIG. 5 illustrates the displacement of a memory bank (memory bank no. 7) from the subgroup 410 that is assigned to the second memory controller $MC_2$ to the subgroup 410 that is assigned to the first memory controller $MC_1$.

The memory access system 501 modifies the assignment, for example, due to an application case that occurs. For example, a software driver on a CPU wishes to write to the memory bank 7, while another software driver, on a second CPU, would like to write simultaneously to the memory bank 5. This is made possible by the modified assignment. In this case the allocation unit 412 is instructed, via the activation signal 430, to connect the memory controller MC1 to the memory bank 7 and, at the same time or shortly before, to disconnect the connection between the memory controller MC2 and the memory bank 7.

Figure 6:
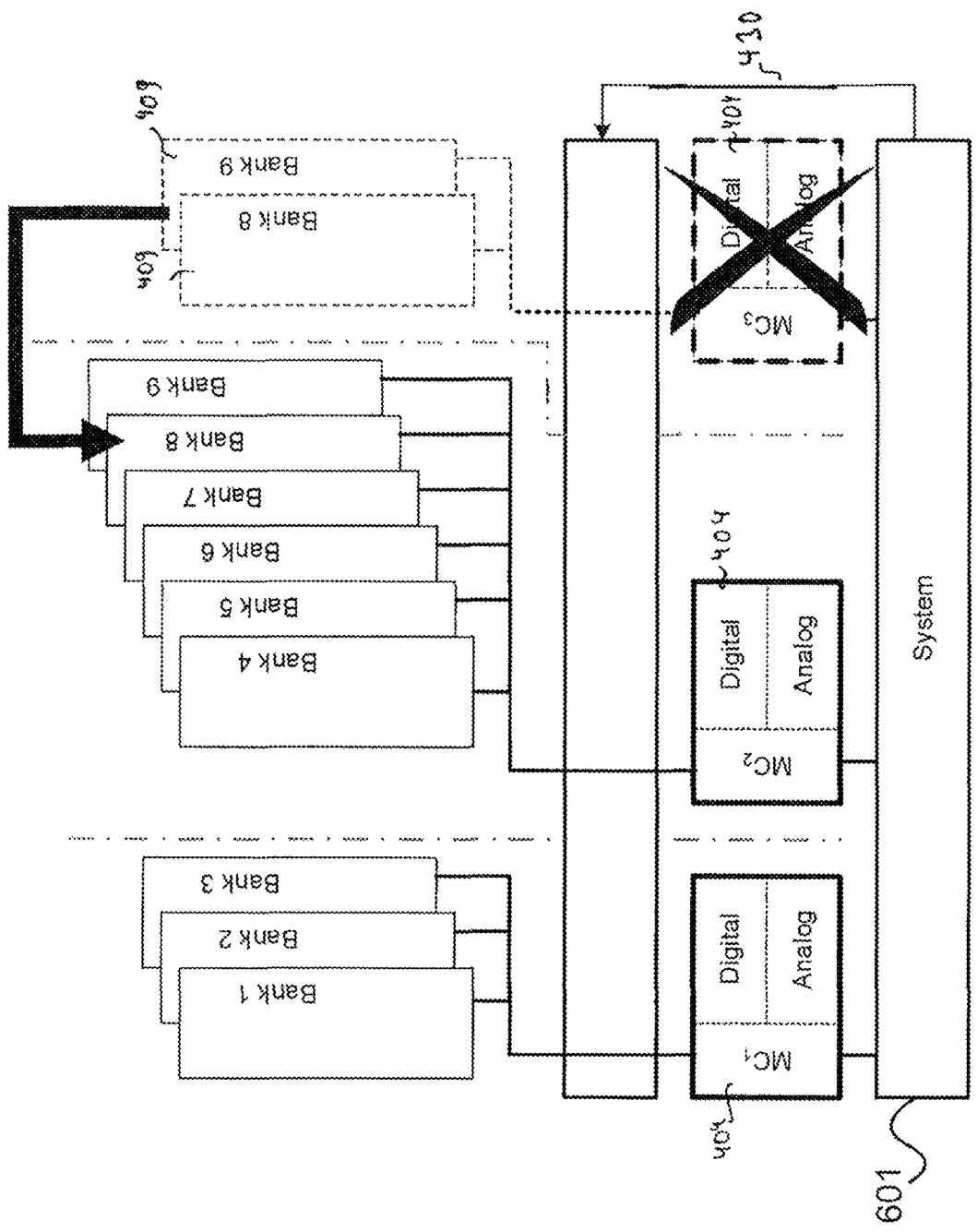
FIG. 6 illustrates the displacement of all memory banks from a subgroup that is assigned to one memory controller to a subgroup that is assigned to a different memory controller.

FIG. 6 illustrates the displacement of all memory banks (memory banks no. 8 and no. 9) from the subgroup assigned to the third memory controller $MC_3$ to the subgroup assigned to the second memory controller $MC_2$.

For example, the memory access system 601 modifies the assignment because the third memory controller $MC_3$ has failed during runtime. The chip can therefore continue to use memory banks no. 8 and no. 9. The memory banks are thus also failure-tolerant; only the performance of the chip with regard to memory accesses is decreased thereby (because three accesses simultaneously are no longer possible).

As mentioned above, the allocation unit 412 routes the digital and analog signals generated by the memory controllers 404 to the memory banks 409 in accordance with the current assignment, i.e. establishes corresponding connections between the memory controllers 404 and the memory banks 409. It modifies this assignment in response to a corresponding event, for example the command that the assignment should be modified due to an application case that has occurred, or the detection that a memory controller has failed.

For this purpose, the allocation unit can receive an allocation signal from the memory access system 401, according to which it establishes the connections. The allocation unit 412 can also be considered or designed as part of the memory access system 401 however.

When modifying the assignment, the allocation unit 412 switches the connections accordingly. For example, it selects for each bank the memory controller 404 from which the digital control signals are used. Small input/output register interfaces can be used in order to keep the wiring overhead low, because each memory controller has separate digital control signals. Thus many different registers for activating the switches and local regulators can then be addressed locally at the memory banks 409. For analog signals, for example, there is a local selection of M different supply voltages that are supplied by the M memory controller analog parts (i.e. charge pumps and regulators).

The allocation unit can be formed by means of multiplexers and switches for digital and analog lines, e.g. by using a hierarchical architecture of multiplexers and switches.

Examples are given below for assignment (shown by an arrow —) and the modification thereof for an example with two memory controllers (1 and 2) and four memory banks (1 to 4).

Assignment a: Memory controller 1→memory banks 1, 2, 3;
Memory controller 2→memory bank 4;
Assignment b: Memory controller 1→memory bank 1;

Memory controller 2→memory banks 2, 3, 4;
Memory controller 1 fails, memory controller 2 takes over memory banks from memory controller 1
Memory controller 1 and memory controller 2→memory bank 1 in order to increase the writing throughput (the analog regulators and charge pumps then operate on two parts of the memory bank 1, for example)
Updates of internal firmware during operation:
  Memory controller 1 takes over all memory banks that are being used by programs currently running on the chip;
  memory controller 2 can update its firmware while the chip can continue to operate
System is scalable, i.e. the total number of memory controllers is scalable, for example
  Low-end systems: one memory controller
  Medium-sized systems: two memory controllers
  High-end systems: three memory controllers
Each memory bank can be written to for respective data (e.g. program code, normal application data, log data, secure data such as keys, etc.) and by one or more respective programs (e.g. drivers).

Figure 7:
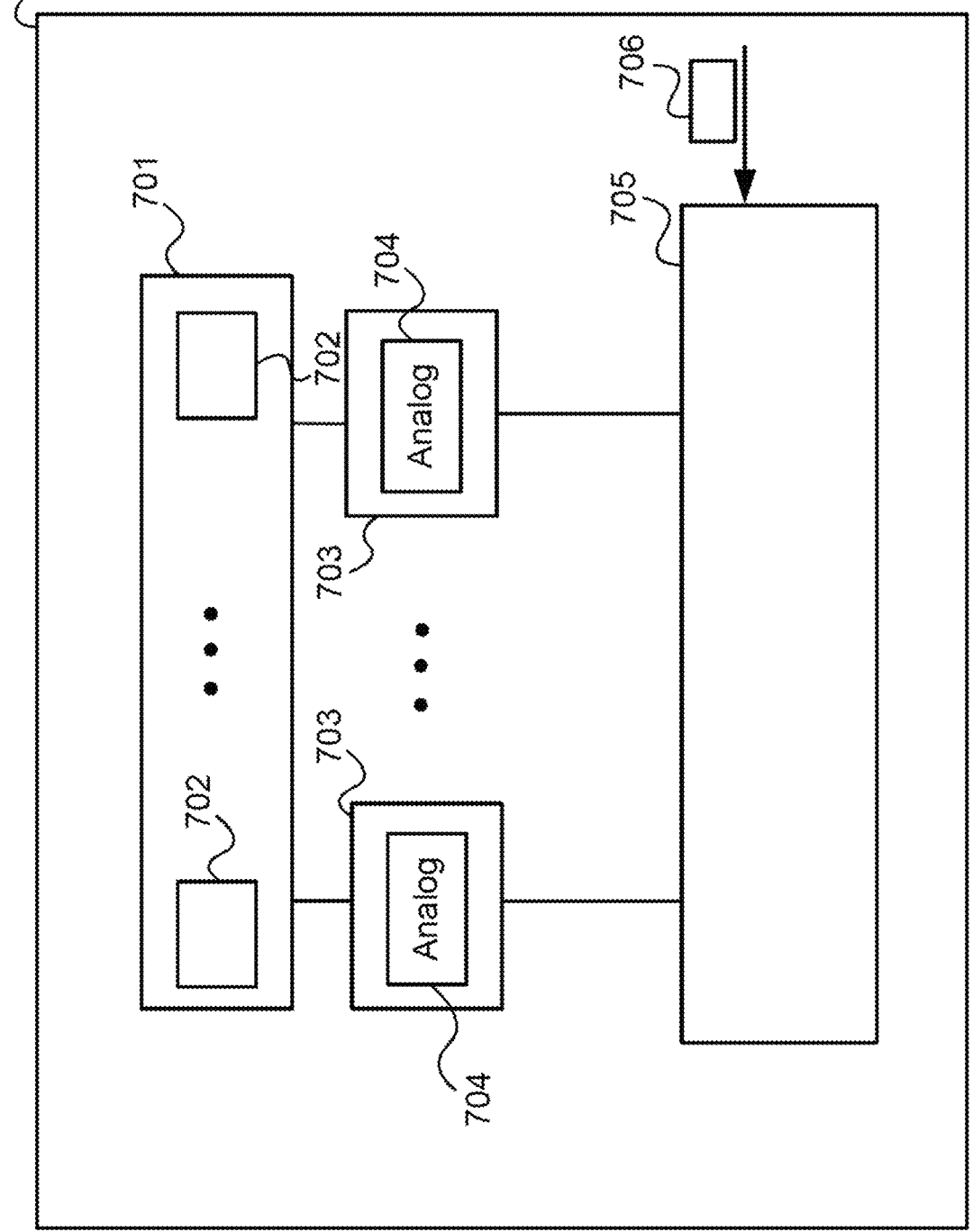
FIG. 7 shows a chip according to one embodiment.

In summary, a chip as shown in FIG. 7 is provided in accordance with various embodiments.

FIG. 7 shows a chip 700 according to one embodiment.

The chip 700 comprises a memory 701 having multiple memory banks 702, each memory bank being readable and writable independently of the other memory banks.

The chip 700 further comprises multiple memory controllers 703, each memory controller 703 having an analog part 704 that is designed to generate supply voltages for accesses to the memory banks.

In addition, the chip 700 comprises a memory access system 705 that is designed to receive a control signal 706 and, depending on the control signal 706, to assign the memory controllers 703 to the memory banks 702, such that each memory controller 703, if it has been assigned to a memory bank 702, carries out memory accesses that relate to the memory bank 702.

According to various embodiments, in other words, the assignment of memory controllers to memory banks is flexible, "memory controller" meaning a unit on a low level having, in particular, the analog circuit components for generating supply voltages. In other words, the memory controllers comprise hardware circuits for access to the memory level, and output signals that are provided directly for the memory. However, the memory controllers can also comprise software elements (such as firmware).

The control signal can be triggered and/or defined by a user configuration. The control signal can indicate the assignment, or the memory access system can ascertain the assignment in response to the reception of the control signal. In response to an internal event triggered by the control signal, the memory access system can ascertain and implement the assignment (i.e. assign the memory controllers to the memory banks accordingly). The control signal can in turn indicate an external event (for the memory access system). A program (software) that is executed on the memory access system can ascertain the assignment and/or implement it in response to the control signal. The control signal can come, for example, from the memory or from one of the memory controllers, e.g. from a fault detection mechanism (of the memory) or as memory controller feedback.

The memory banks can be understood as memory address ranges.

It should be noted that it is not necessary for the analog part and the digital part of a memory controller to together form a unit on one chip. On the contrary, the memory controllers can also be implemented such that all analog parts are combined in one block and then receive separate control signals from the various digital parts. There are thus physically different analog/digital units, and a digital part and an analog part work together in each case. The actual implementation can be "scattered" onto one or more chips, however.

An analog part can also have current sources or current sinks, generate reference signals (voltage, e.g. bandgap; current) and also have special signal generators such as clock signal generators.

The memory access system can be designed to receive multiple control signals in succession and, for each of the control signals, in response to the reception of the control signal, to assign the memory controllers to the memory banks, depending on the control signal, such that each memory controller, if it has been assigned to a memory bank, carries out a memory access that relates to the memory bank. For example, an automatic changeover specified by an external sequence can take place, e.g. an automatic change of the assignment after booting of the chip. A user could also indicate different assignments as a configuration, which are then implemented by the memory access system, successively or upon occurrence of defined external events.

Figure 8:
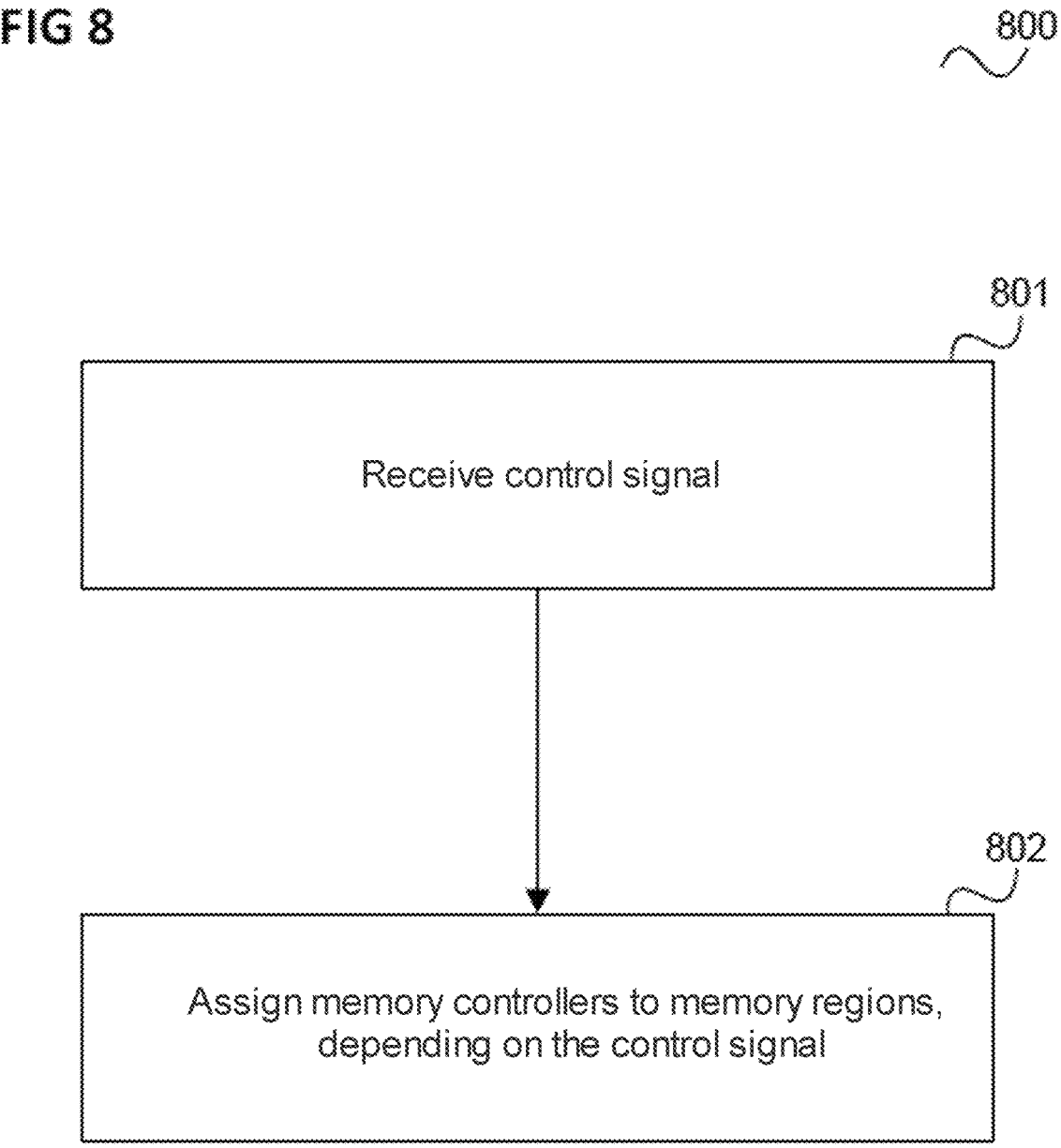
FIG. 8 shows a sequence diagram that represents a method for performing memory accesses to a memory having multiple memory banks.

According to various embodiments, a method is carried out as shown in FIG. 8.

FIG. 8 shows a sequence diagram 800 that represents a method for performing memory accesses to a memory having multiple memory banks, each memory bank being readable and writable independently of the other memory banks.

In 801 a control signal is received. In 802 multiple memory controllers, each memory controller having an analog part that is designed to generate supply voltages for accesses to the memory banks, are assigned, depending on the control signal, to the memory banks such that each memory controller, if it has been assigned to a memory bank, carries out memory accesses that relate to the memory bank.

Figure 9:
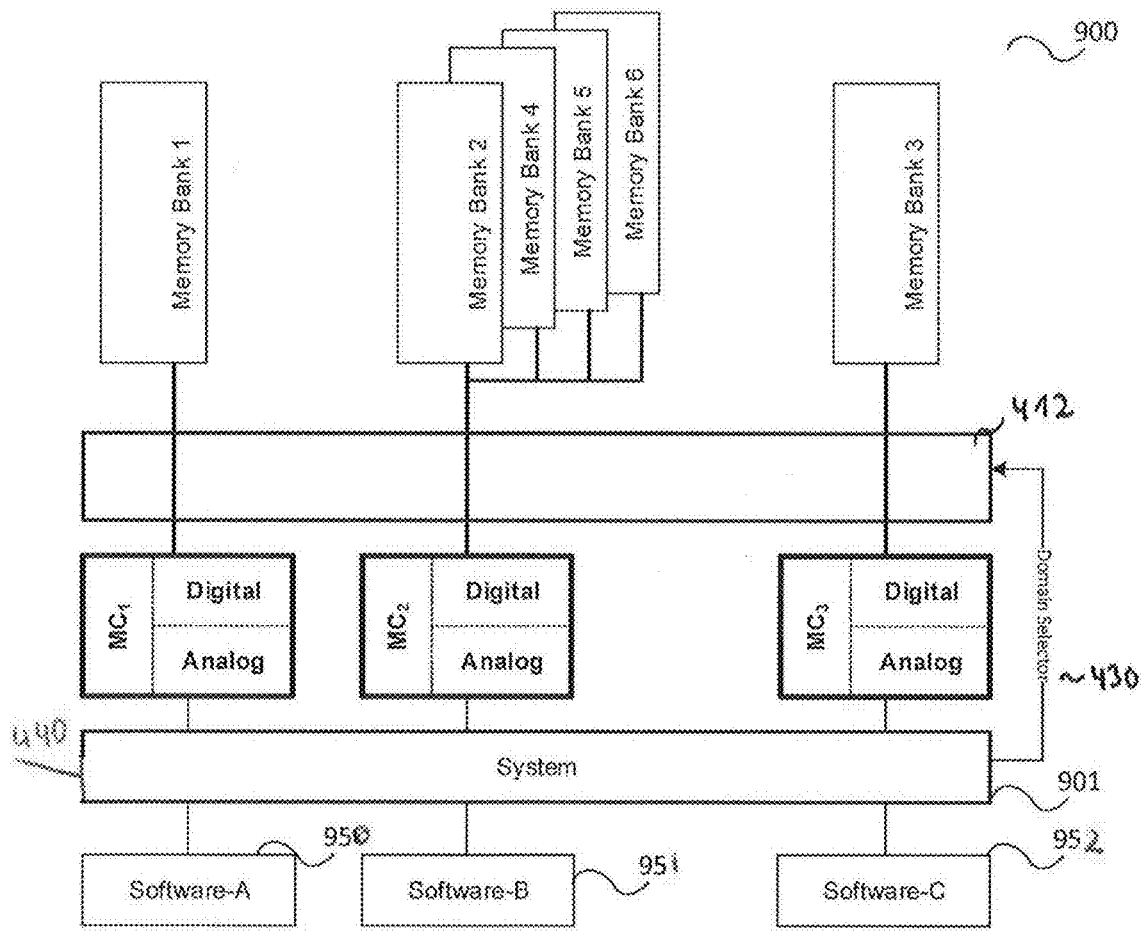
FIG. 9 shows a chip according to one embodiment in a starting state after reset.
Figure 10:
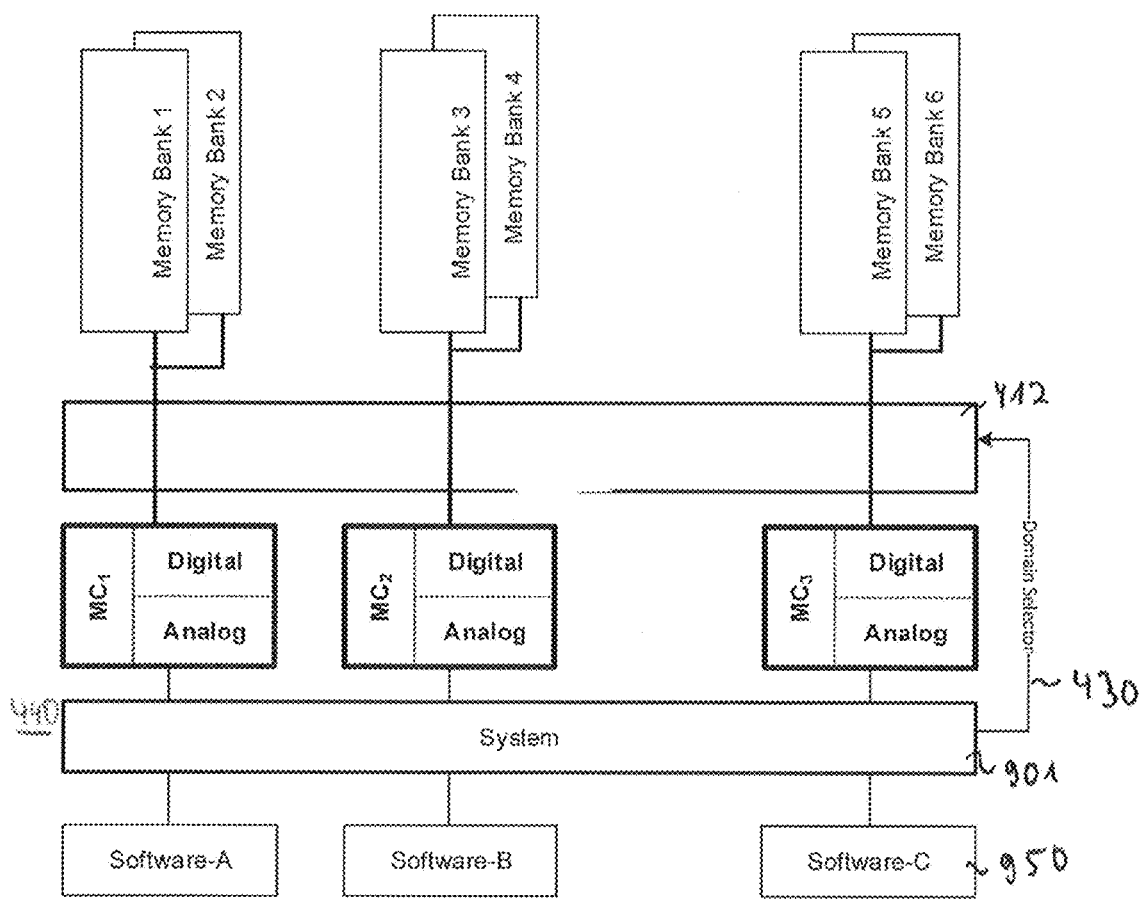
FIG. 10 shows a chip after reset and execution of the system start routine.
Figure 11:
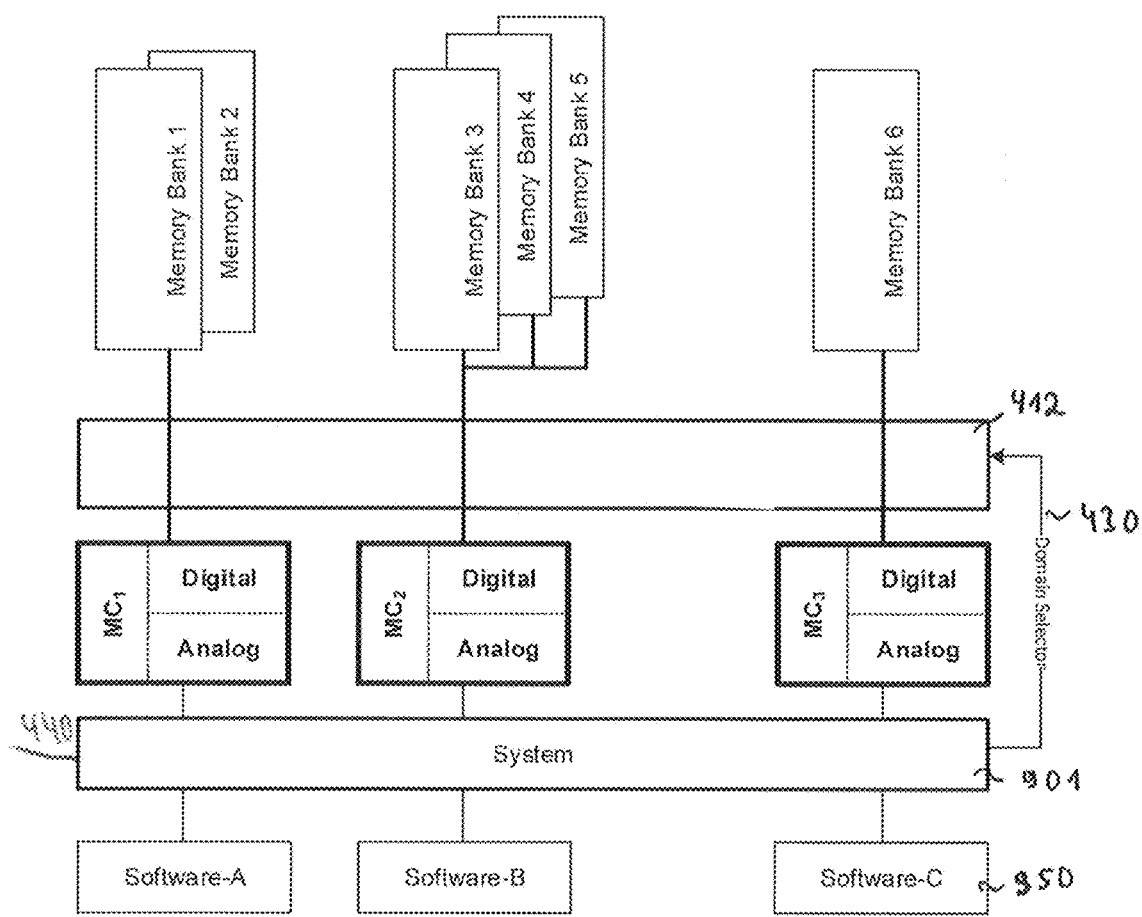
FIG. 11 shows a chip after reset, execution of the system start routine and configuration by way of the operating system.

FIGS. 9 to 11 show how a data processing unit is able to assume different operating states, which differ in particular in terms of the assignments of memory controllers to memory banks. Operating states can be for example during a boot process, immediately after a boot process, during a reset, immediately after a reset, after the system start routine, test mode, software update or the like. The operating states can differ here in terms of the requirement for the number of memory banks to be written to. The operating states can differ in terms of the requirement for the subdivision of the memory banks to be written to. In other embodiments, the operating states differ in terms of the type and number of the active software applications. Some examples will be shown below.

FIG. 9 shows a chip 900 according to one embodiment in a starting state after reset. The chip contains a memory access system 901. The latter receives a state signal 440 that indicates the operating state, as are described in the preceding paragraph. The state signal 440 may have been generated by a multiplicity of components, for example by the power-up circuit, the processor cores or for example a fault detection circuit. A reset is used to take the data processing into a predetermined starting state, because many of the registers of the chip 900 are each taken into a predetermined state during the reset. The memory access system 901 is accessed by three different software applications 950, 951 and 952, which are able to run on different CPUs/virtual machines of the system. The software applications Software A 950 and Software B 950 can request separate write operations, independent of the others, to the memory banks 1 and 2.

The assignment, also called allocation, of the memory banks to the memory controllers MC1 and MC2 allows the memory controller MC1 to perform the write operation to memory bank 1 and the memory controller MC2 to perform the write operation to bank 2 independently of one another. After the assignments have been calculated, the memory access system 901 instructs the allocation unit 412 to connect the memory bank 1 to the memory controller MC1 and, in parallel with this, to connect the memory controller MC2 to the memory banks 2, 4, 5 and 6 and the memory controller MC3 to the memory bank 3 in accordance with the assignments. The subsequent parallel handling of the memory access operations saves time. It can also increase security, because the different applications 950 and 951 use different memory controllers.

FIG. 10 shows the chip in the state after reset and after subsequent execution of a system start routine. The system start routine involves for example specific parts of the chip being checked and others being put into a state that permits the immediate launch of specific software applications.

The allocation unit 412 is changed over here from the state in FIG. 9 by the control signal 430 of the system. This attains the normal state of the system, in which 2 respective banks are assigned to one memory controller; in this case MC1 controls the memory banks 1 and 2, MC2 controls the memory banks 3 and 4 and MC3 controls the memory banks 5 and 6. Therefore, one memory bank can be used for read accesses and the other memory bank can be used for write accesses, for example.

FIG. 11 shows a chip 900 after reset, execution of the system start routine and additional configuration by way of the operating system in order to prepare for a software over the air update operation. The state in FIG. 10 is attained from the state in FIG. 11 as a result of the changeover by way of the control signal of the system. This prepares for a software over the air update operation. Software over the air update is understood in the automotive sector to mean that new data or code are/is sent to automobiles by mobile radio. The telematic unit of an automobile is used to receive and examine the data and/or code before they are distributed to individual control units, or the microcontrollers thereof, which then for their part program their internal (embedded) memories such as e.g. embedded flash with the new code or data. Such an operation requires many write cycles, since a portion of the memory bank is supposed to be rewritten in a relatively short time. The state in FIG. 11 arises from the state in FIG. 10 following a changeover by way of the control signal 430. The allocation unit 412 then connects the memory controller MC1 to the banks 1 and 2, the memory controller MC2 to the memory banks 3, 4 and 5 and the memory controller MC3 to the memory bank 6. This state facilitates simultaneous, mutually independent write accesses to the banks 2, 5 and 6 by way of the memory controllers MC1, MC2 and MC3.

Figure 12:
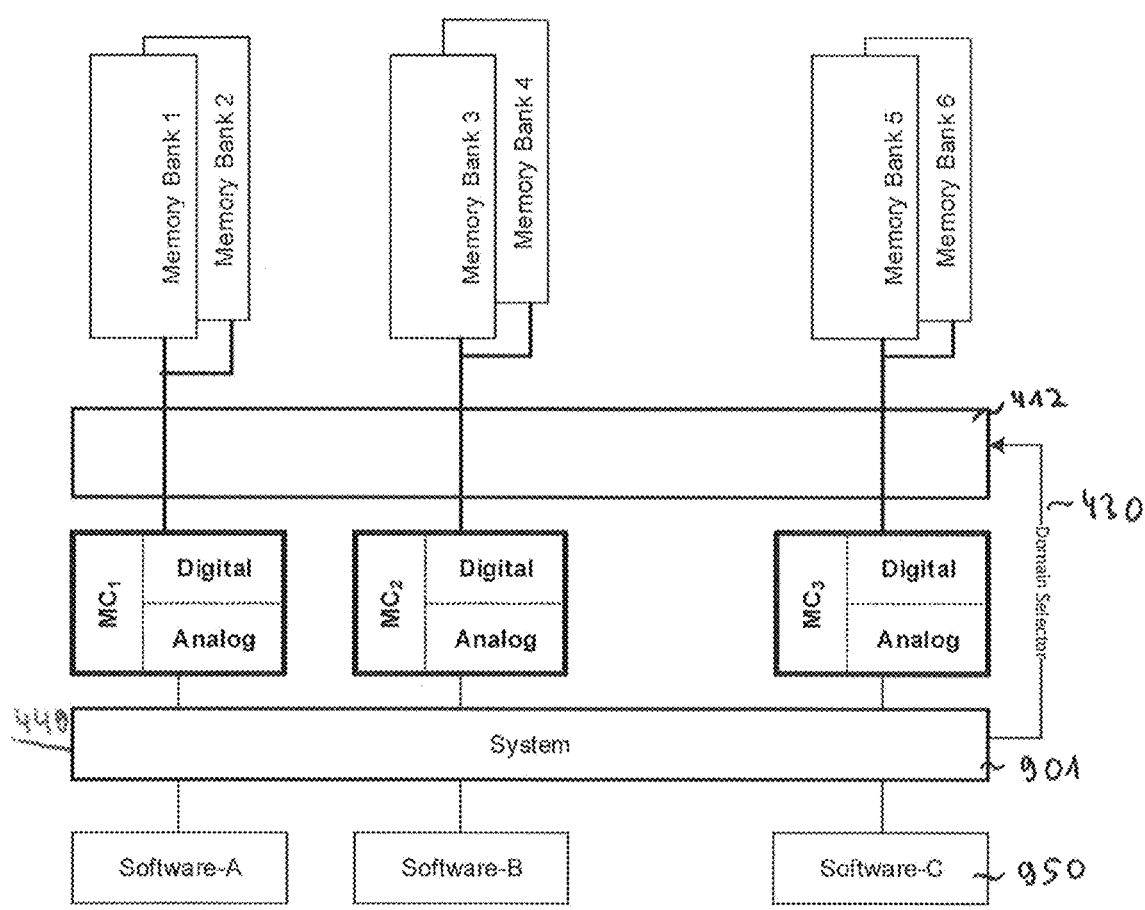
FIG. 12 shows a possible state of a chip after reset, execution of the system start routine, configuration by way of the operating system for software update and fresh configuration by way of the operating system.
Figure 13:
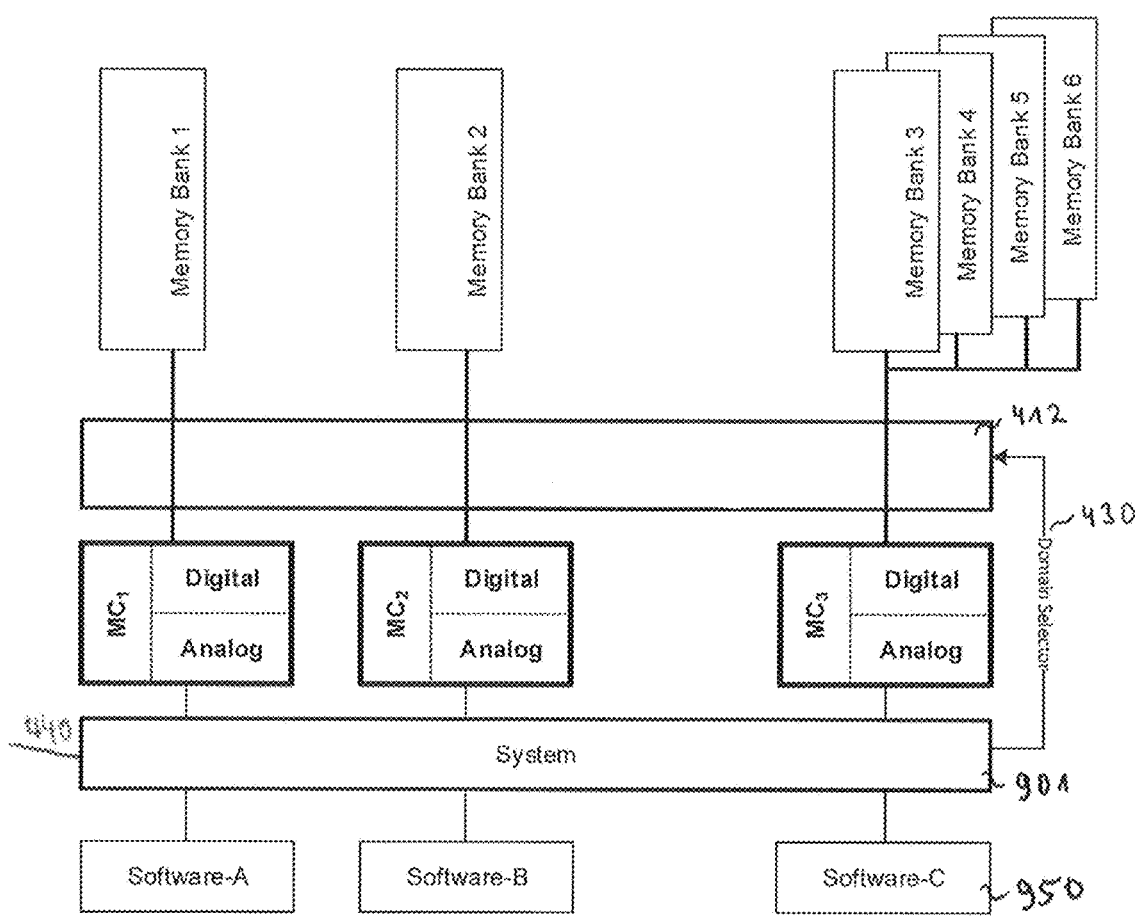
FIG. 13 shows a chip in a starting state after reset according to one embodiment.
Figure 14:
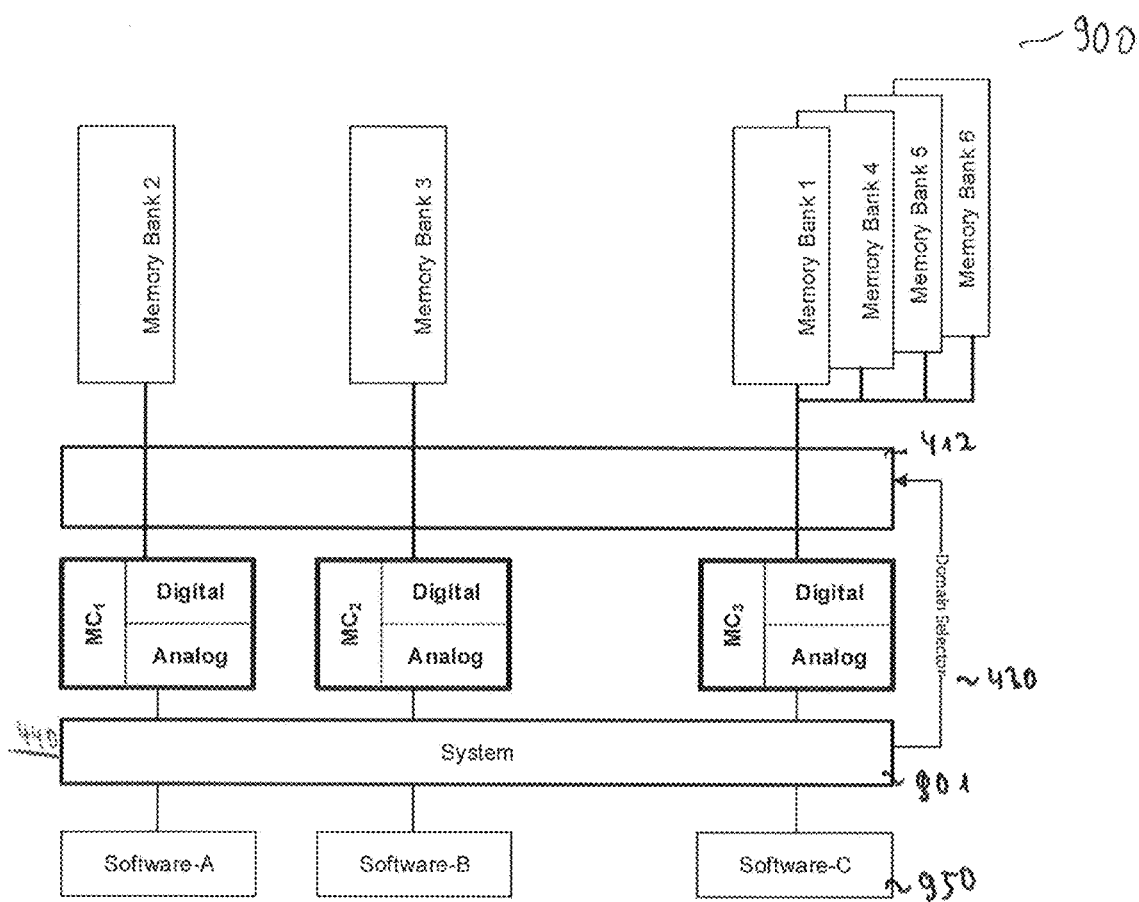
FIG. 14 shows another possible state of a chip after reset and execution of the system start routine.
Figure 15:
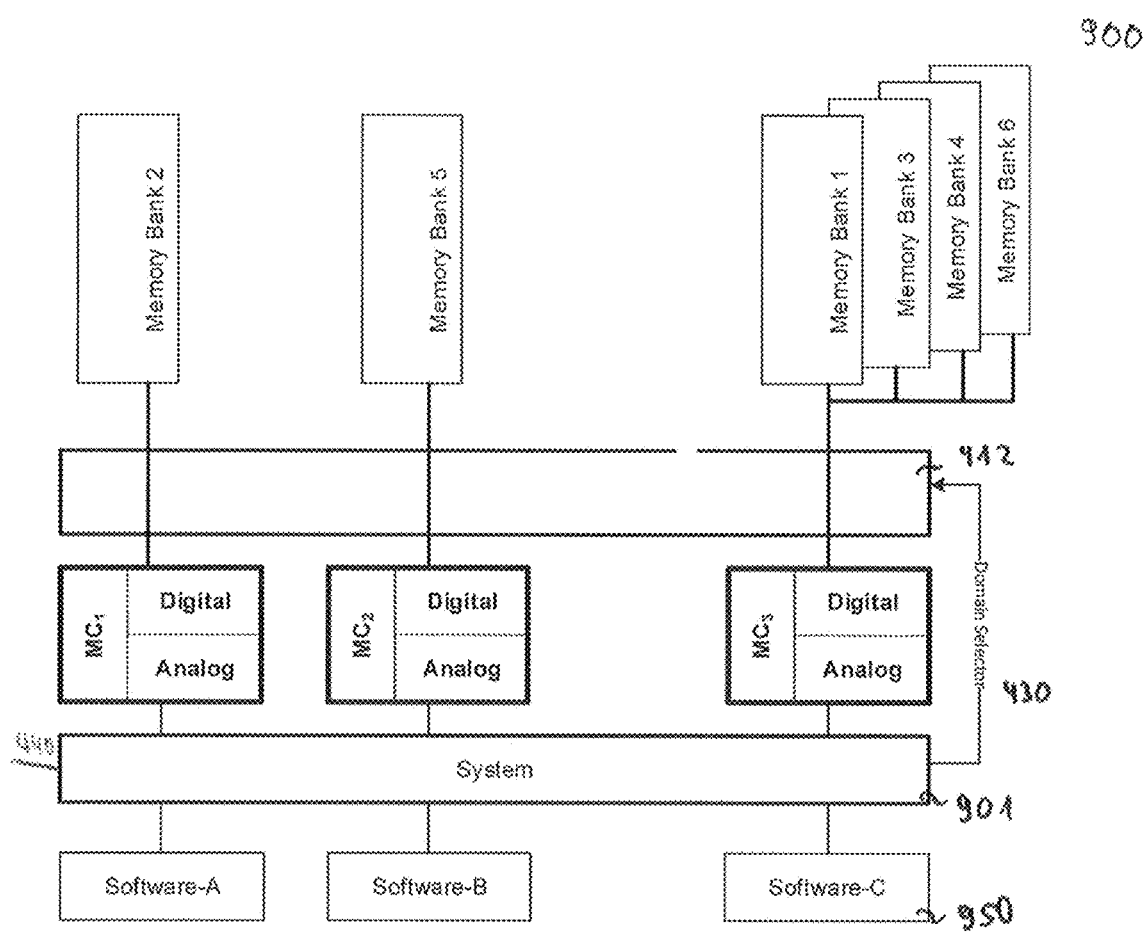
FIG. 15 shows a possible state of a chip after reset, execution of the system start routine and configuration by way of the operating system in order to prepare for a software over the air update operation.
Figure 16:
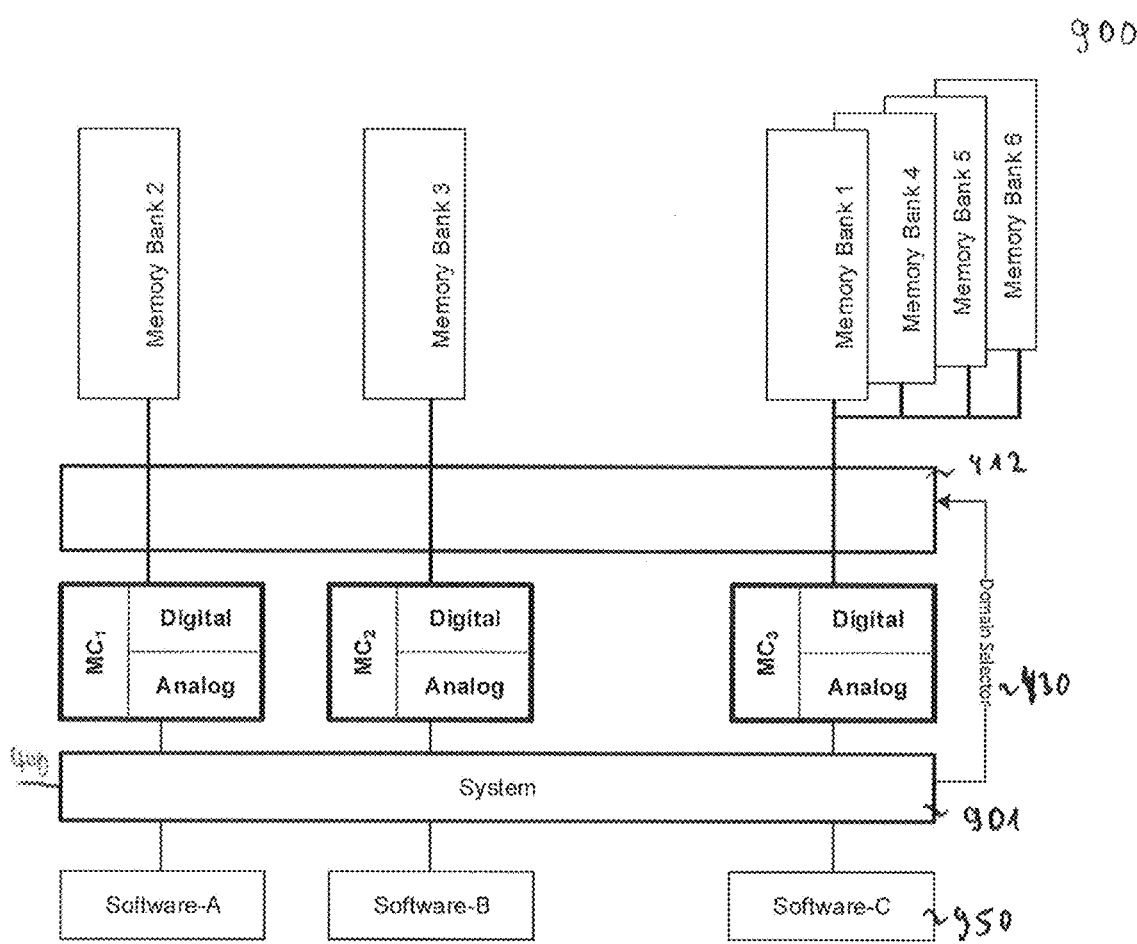
FIG. 16 shows a possible state of a chip after reset, execution of the system start routine, configuration by way of the operating system for software update and fresh configuration by way of the operating system.

FIG. 12 shows a data processing device after reset, execution of the system start routine, configuration by way of the operating system for software update and fresh configuration by way of the operating system in order to attain the normal state again after execution of the system start routine. The state described in FIG. 12 is equivalent to the state in FIG. 10.

FIG. 17 shows a table representing 4 different states of a data processing device. The left-hand part of the table shows the reference to the figures of the application and, in the next column, indicates for each of the 4 states which banks need to be written to simultaneously. The right-hand part of the table shows a possible interconnection of the banks with the memory controllers in order to facilitate the demanded write operations.

The first state ("Reset", FIG. 9) is the allocation of the memory banks after a system reset or power-on of the integral system. After the reset, in one example of an embodiment, two different startup routines become active that prepare the system for operation and perform the write operations to banks (here, in this example, to banks 1 and 2) independently of one another. Normally here, the data written and possibly also the access rights are different (e.g. startup routine of the main system and startup routine of the security coprocessor). Depending on the memory used, the write operations can reach long performance times (microseconds . . . milliseconds, possibly even seconds).

In order to be able to carry out the demanded write operations quickly, 2 to 3 memory controllers are required, depending on the state, so that the operations can be performed at the same time; this is necessary in particular during the startup phase of the integral system, because the application cannot start until the startup routines have been executed.

After the execution of the startup routines, the application launches. This requires a new configuration for the banks, because the application involves different banks than during the startup phase being written to simultaneously, e.g. data logging of the application and of the security coprocessor. This "After Boot Code" state is described in the table and in FIG. 10.

While the system is running, a special case can arise: an update for specific code/data of the system is necessary, what is known as a "software update over the air". This state again requires a different allocation of the banks to the memory controllers, see the "Software over the Air Update" state and FIG. 11.

After the update for the system, the allocation of the banks to the memory controllers needs to be changed to the standard configuration again ("After Boot Code", FIG. 10).

FIGS. 9-12 show a possible allocation of the banks to the memory controllers that facilitate the demanded write operations depending on the state. The allocations shown in the figures are not the only possible allocations, however; other allocations meeting the same requirements are likewise possible and are described as examples in FIG. 18 (table) and in FIGS. 13-16.

The states shown in FIGS. 9-12 show the smallest possible number of changeover events; this can be advantageous if the changeover of the banks requires a certain time due to the high voltages.

Each of the states shown in FIGS. 13-16 and 18 requires multiple banks to be changed over; this can be advantageous if preferably only one bank is supposed to be under the control of a memory controller, e.g. for safety and/or security reasons.

The embodiment facilitates any allocation of banks to memory controllers; these allocations can be changed arbitrarily while the system is running. It is also possible here to select states that have already been used again. The dynamic configuration is possible, but not necessarily imperative. There may also be systems that retain a state. The states of the system may be for different applications and different.

FIG. 19 uses a sequence diagram to show an embodiment of the method. In a first step 1901, information about the operating state of the chip is received. In the next step 1902, assignments of memory controllers to memory banks are dynamically produced on the basis of the operating state of the chip. In step 1903, the memory banks are activated by way of the memory controllers in accordance with the assignments. After step 1903, the method preferably starts again with step 1901.

LIST OF REFERENCE SIGNS

- 100 Data processing device
- 101 Processor
- 102 Data memory system
- 103 Bus
- 104 Memory controller
- 105 Memory
- 106 Processor cores
- 107 Digital part
- 108 Analog part
- 109 Memory banks
- 201 Memory access system
- 204 Memory controller
- 209 Memory banks
- 301 Memory access system
- 304 Memory controller
- 309 Memory banks
- 310 Memory bank subgroup
- 311 Virtual machines/programs
- 401 Memory access system
- 404 Memory controller
- 409 Memory banks
- 412 Allocation unit
- 430 Control signal
- 440 State signal
- 501 Memory access system
- 601 Memory access system
- 700 Data processing device
- 701 Memory
- 702 Memory banks
- 703 Memory controller
- 704 Analog part
- 705 Memory access system
- 706 Control signal
- 800 Sequence diagram
- 801, 802 Process steps
- 901 Memory access system
- 950 Software application
- 1901, 1902, 1903 Process steps

The invention claimed is:

1. A method for dynamically activating a plurality of memory banks by way of a plurality of memory controllers in a chip, each of the memory banks being readable and writable independent of the other memory banks, and each of the memory banks being activatable by multiple of the plurality of memory controllers in each case, the method comprising:

receiving information about an operating state of the chip;

dynamically producing assignments of memory controllers to the memory banks based on the operating state of the chip, wherein the operating state of the chip is a boot state, a reset state, a test mode state, or a software update state; and activating the memory banks by way of the memory controllers in accordance with the produced assignments.

2. The method as claimed in claim 1, wherein the memory banks comprise nonvolatile memories.

3. The method as claimed in claim 1, wherein the assignments are produced multiple times during operation of the chip.

4. The method as claimed in claim 1, wherein the operating state of the chip corresponds with a requirement for a number of memory banks to be written to.

5. The method as claimed in claim 1, wherein the operating state of the chip corresponds with a requirement for a subdivision of the memory banks to be written to.

6. The method as claimed in claim 1, wherein the operating state of the chip corresponds with a type and number of active software applications.

7. A chip having a plurality of memory banks and a plurality of memory controllers, each of the memory banks being readable and writable independent of the other memory banks, and each of the memory banks being activatable by multiple of the plurality of memory controllers in each case, comprising:

a memory access system designed to receive information about an operating state of the chip, and to dynamically produce assignments of memory controllers to the memory banks based on the operating state of the chip, wherein the operating state of the chip is a boot state, a reset state, a test mode state, or a software update state; and an allocation unit to connect memory banks to memory controllers in accordance with the assignments in response to an activation signal that is generated by the memory access system.

8. The chip as claimed in claim 7, wherein the memory banks comprise nonvolatile memories.

9. The chip as claimed in claim 7, wherein the assignments are produced multiple times during operation of the chip.

10. The chip as claimed in claim 7, wherein the operating state of the chip differs in terms of a requirement for a number of memory banks to be written to.

11. The chip as claimed in claim 7, wherein the operating state of the chip differs in terms of a requirement for a subdivision of the memory banks to be written to.

12. The chip as claimed in claim 7, wherein the operating state of the chip differs in terms of a type and number of active software applications.

* * * * *